United States Patent [19]

Propst et al.

[11] 3,734,526
[45] May 22, 1973

[54] CART
[75] Inventors: Robert L. Propst, Ann Arbor; James O. Kelley, Saline, both of Mich.
[73] Assignee: Herman Miller Inc., Zeeland, Mich.
[22] Filed: Nov. 5, 1970
[21] Appl. No.: 87,144

[52] U.S. Cl. ............ 280/33.99 T, 213/221, 248/224, 280/47.35, 280/79.3, 280/481, 293/69 R
[51] Int. Cl. ................................................ B62b 3/02
[58] Field of Search ..................... 280/33.99, 47.35, 280/47.34, 79.3, 79.2, 79.1, 408, 481; 248/224; 108/159, 44, 152; 293/63, 60, 62, 69 R; 213/221

[56] References Cited
UNITED STATES PATENTS

| 3,241,850 | 3/1966 | Propst | 280/33.99 T |
| 1,914,974 | 6/1933 | McGrail | 248/224 X |
| 3,542,446 | 11/1970 | Joyce | 108/152 X |
| 2,873,993 | 2/1959 | Savke | 293/62 |
| 3,212,646 | 10/1965 | Propst | 211/87 |
| 3,241,898 | 3/1966 | Propst | 312/107 |

FOREIGN PATENTS OR APPLICATIONS

| 260,386 | 8/1949 | Switzerland | 280/79.3 |
| 312,968 | 6/1929 | Great Britain | 213/221 |

*Primary Examiner*—Leo Friaglia
*Assistant Examiner*—Milton L. Smith
*Attorney*—Price, Heneveld, Huizenga & Cooper

[57] ABSTRACT

A cart which has a wheeled base and an upstanding back for carrying drawer and tray supporting frames during transport, integrally molded with the base. Supporting rails project upwardly and outwardly from the back for cooperation with hangers on the drawer supporting frames. Resilient bumpers are provided at each front corner of the base and include forwardly projecting tabs which cooperate with rearwardly projecting flanges at the rear of another cart whereby the carts can be transported in ganged fashion. The backs also include rearwardly and downwardly projecting hanger flanges such that one cart can be hung on the rail of another.

19 Claims, 12 Drawing Figures

PATENTED MAY 22 1973 3,734,526

INVENTORS
ROBERT L. PROPST
JAMES O. KELLEY
BY
ATTORNEYS

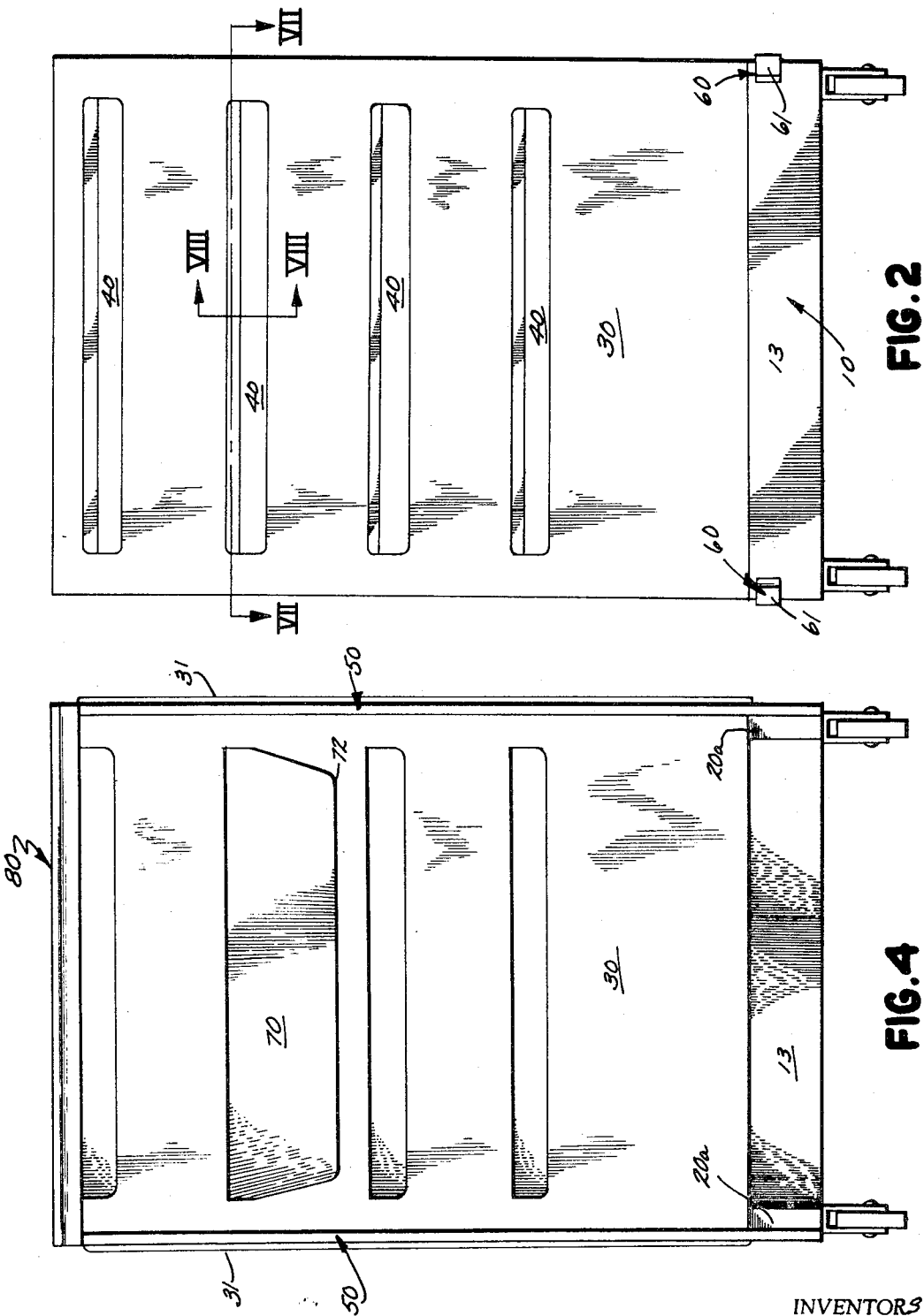

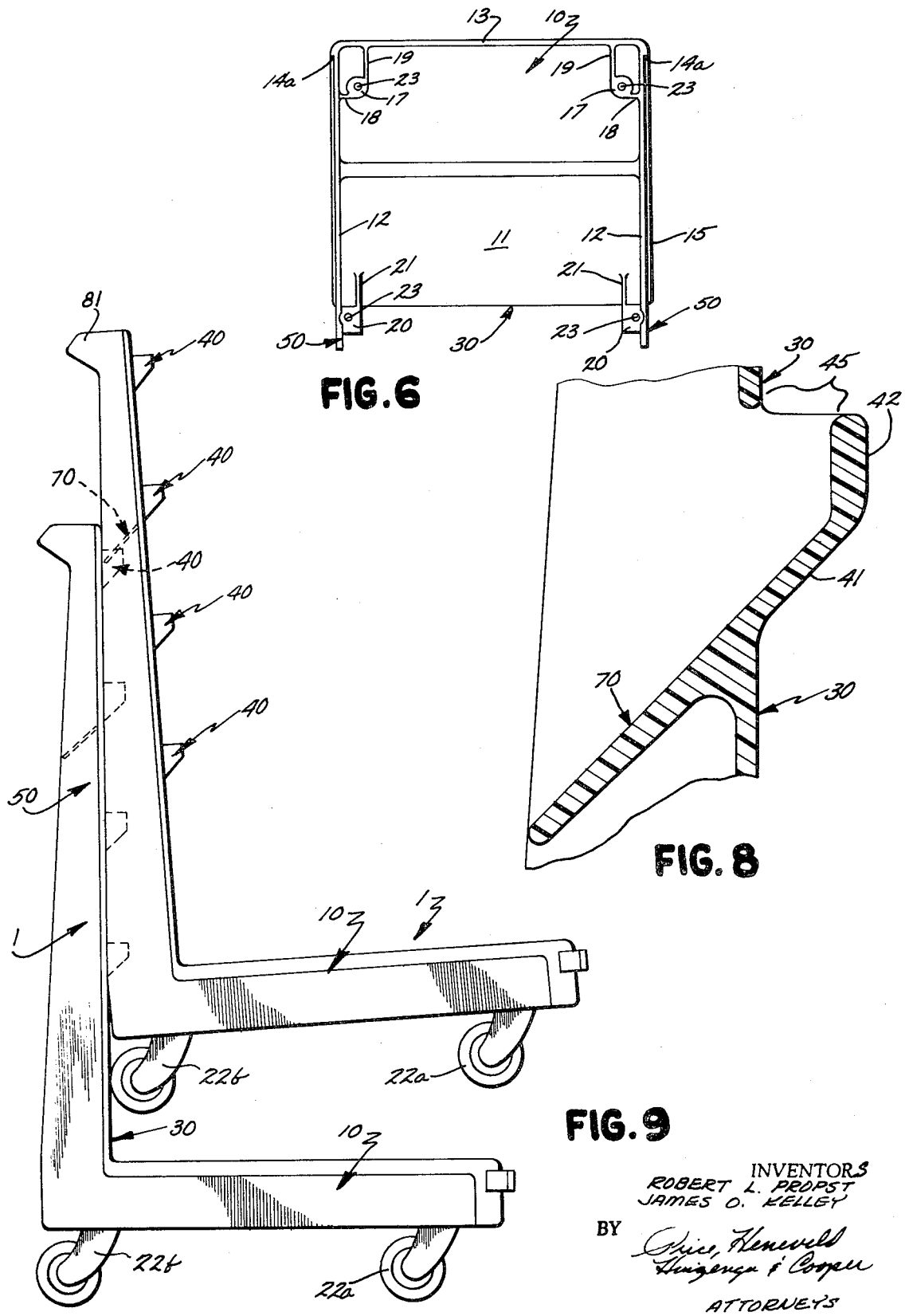

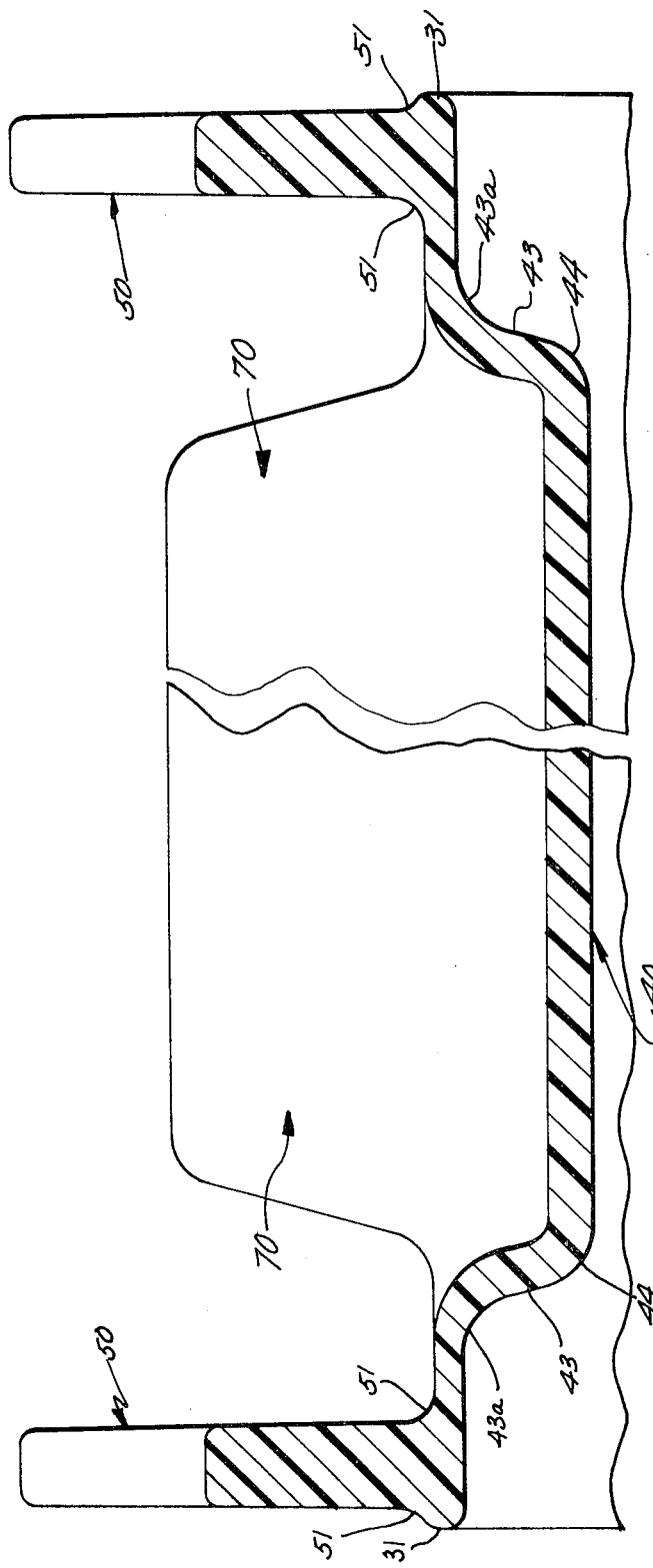
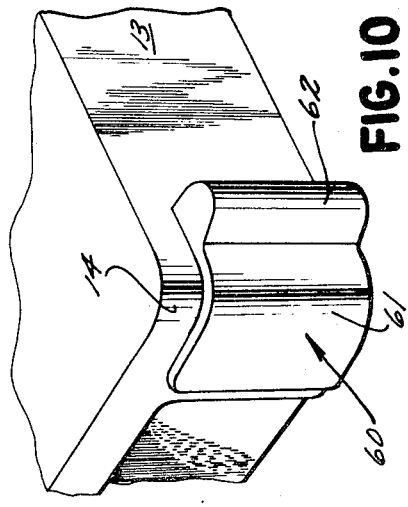
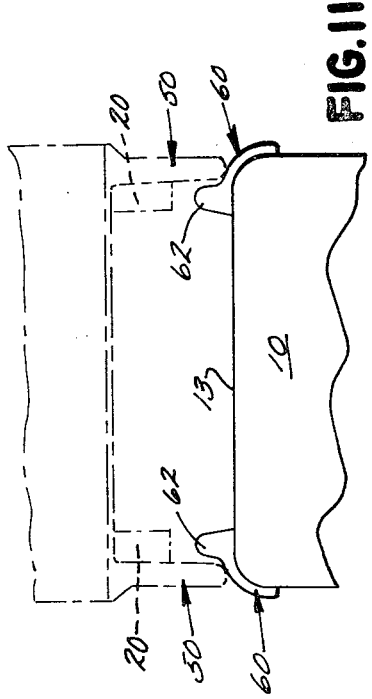

CART

BACKGROUND OF THE INVENTION

The present invention relates to carts for transporting objects supported thereon. It is particularly adapted for transporting drawer and shelf supporting structures used in hospital environments. It comprises a number of improvements on the cart transportation system disclosed in U.S. Pat. Nos. 3,212,646; 3,241,850 and 3,241,898. It is specifically designed for use in combination with the drawer and tray shelf supporting structures disclosed in co-pending U.S. patent application Ser. No. 79,890, filed Oct. 12, 1970 entitled DRAWER, TRAY SHELF AND SUPPORTING STRUCTURES THEREFOR.

In hospital environments, and other environments as well, versatility, cleanliness and economy of construction are key factors to be considered in designing facilities and equipment. Yet, present hospital equipment is frequently lacking in one or more of these areas. Conventional cupboards and cabinets, for example, are generally permanent or semi-permanent in construction. Any materials to be placed in such units must be first loaded onto carts, transported to the units and then transferred to the drawers of the units. Any materials or medicines already in those drawers which are no longer desired must be removed, placed on the cart and transported back to a central storage area. The carts used are generally unsightly and almost always difficult to clean.

While the aforementioned U.S. patents constitute a significant step towards the realization of the goals of versatility, cleanability and the economy of construction, the present invention constitutes yet another significant advance over the cart transporting system disclosed in those patents. In the present invention, for example, the cart provided has a wheeled base and an upstanding back which includes outwardly and upwardly projecting rails having closed ends such that objects supported on the rails cannot slide off the ends thereof. Thus, the mobility of the system is improved since a drawer supporting frame hung on a rail will be positively maintained in a fixed lateral position with respect to the cart. There need be, thus, no positive frictional engagement between the hanger on the drawer supporting structure and the rail in order to prevent such lateral shifting.

As a result, drawers can be filled and stored in a central location. When their contents are demanded, they can be inserted into a drawer supporting frame which in turn can be loaded onto a cart. The cart, drawer supporting frame, and filled drawers can then be transported to the area where the contents of the drawer are required.

In another aspect of this invention, the front corners of the base are provided with a combination resilient bumper and ganging means. The rear of each cart is provided with a means for mating engagement with the ganging means of the combination bumper and ganging means whereby a plurality of carts can be transported in ganged fashion, even when objects such as drawer supporting structures are loaded on the carts. Thus, walls and other objects are protected from banging by the cart with a structure which simultaneously provides a ganging means.

The carts can be ganged in yet another fashion, provided they are empty. A rearwardly and downwardly projecting hanger projects from the back of each cart. At one point, it is approximately the same width as the length of one of the closed rails. Its ends are slanted inwardly and its outer corners are rounded such that it can readily be inserted into one of the closed rails of another cart without the need for careful lateral positioning. This improves the mobility of the carts by making them easier to stack for ganging, storage and transportation when empty.

A system of unique structural ribs and braces makes it possible to manufacture this cart with a minimum of plastic, and the ribs are designed in such a manner that they do not interfere with the cleanability of the cart. The cart base, for example, comprises a flat top with a downwardly depending front and sides which reinforce and rigidify the top. The flat top extends laterally a short distance beyond the sides, to provide a decorative rib which also aids in preventing the sides from getting scratched. Similarly, flanges project rearwardly from an upstanding back panel. These flanges are continuous with the sides of the base, and the back panel extends slightly laterally beyond each of the flanges. As above, these flanges act to reinforce, and the overhanging back panel provides a decorative trim and helps prevent scraping of the flanges.

Finally, economy is effectuated because of the fact that the rails of the cart are also thin and sheet-like, as is the back panel of the cart. This is made possible because the rails are formed by integrally molded deviations from the planar back. This eliminates the need for excess quantities of plastic to manufacture a strong rail.

These and other objects and advantages of this invention will be seen and understood by reference to the appended specification and drawings.

BRIEF DESCRIPTION OF THE DRAWINGS

FIG. 2 is a front view of the cart;
FIG. 4 is a rear view of the cart;
FIG. 6 is a bottom view of the cart;
FIG. 7 is a cross section taken along plane VII—VII of FIG. 2;
FIG. 8 is a fragmentary cross section taken along plane VIII—VIII of FIG. 2;
FIG. 9 is a side view of a plurality of carts stacked together;
FIG. 10 is a perspective view of a front corner of the cart showing the combination bumper and gnaging means;
FIG. 11 is a plan view of the front of one cart engaging the rear of another cart, shown in phantom.

DESCRIPTION OF THE PREFERRED EMBODIMENT

Figure 3:
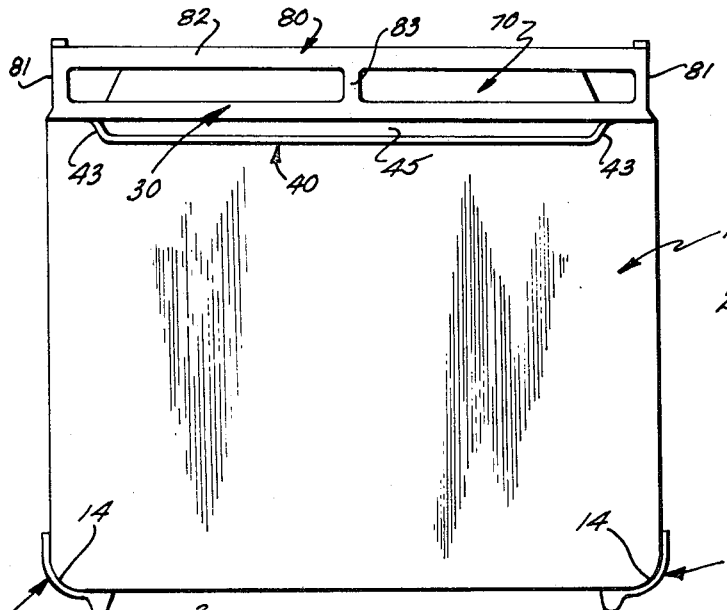
FIG. 3 is a side view of the cart with a drawer supporting structure being hung thereon.
Figure 5:
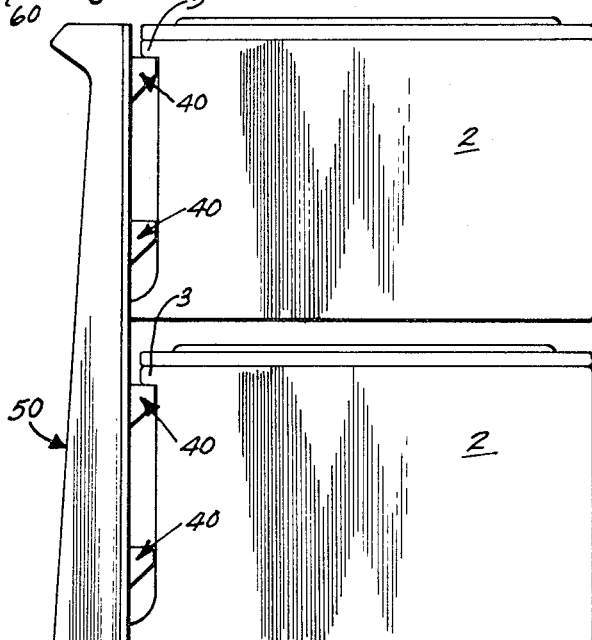
FIG. 5 is a plan view of the cart.

FIG. 3 shows the preferred embodiment cart 1 with a drawer supporting frame 2 hanging thereon. The cart 1 includes a wheeled base 10 and an upstanding back 30 at the rear thereof (FIG. 2). A hanger 3 on drawer supporting frame 2 engages one of the upwardly and outwardly projecting rails 40. A flange 50 projects rearwardly from each side of back 30 (FIGS. 3 and 4) to provide reinforcement therefor and to provide a means for matingly engaging the combination bumper and ganging means 60 (FIG. 10) whereby a plurality of carts can be transported in ganged fashion (FIG. 11) even when drawer supporting structures 2 are supported thereon. The carts can also be ganged by stacking, when they are empty, since each cart 1 includes a hanger 70 projecting rearwardly and downwardly from its back 30 for engagement with the rail 40 of another cart (FIG. 9). Finally, each cart 1 includes a handle 80 at the top thereof to facilitate control thereof during transport (FIG. 5).

Each cart 1 is integrally molded of a plastic material such as a glass filled polyester resin. It can be conveniently fabricated by using conventional compression or injection molding techniques. The only additional assembly required is the addition of casters 22 and combination bumper and ganging means 60. Preferably, the plastic is provided with a smooth finish to facilitate cleaning. Where sterilization is important, the cart is made of a high temperature resistant plastic.

Figure 1:
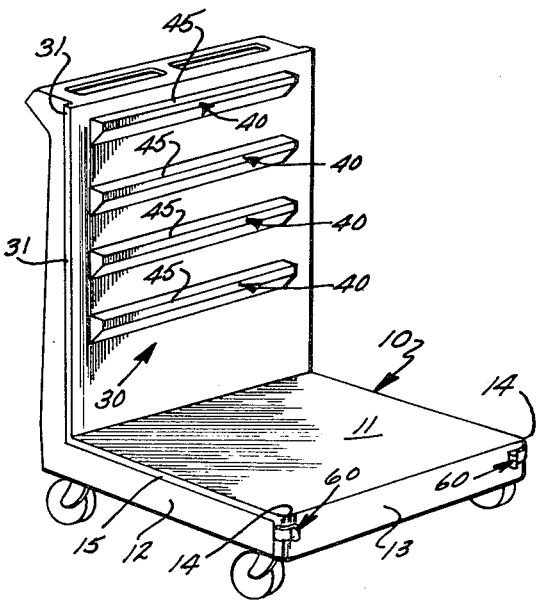
FIG. 1 is a perspective view of the cart.

Wheeled base 10 includes a top 11, downwardly depending sides 12 and a downwardly depending front 13 (FIG. 1). Front 13 is flush with the front edge of top 11, and extends around each front corner 14 of base 10, still flush with the edge of top 11. Corners 14 are outcurved for appearance and to facilitate cleaning. At the sides 12 of base 10, however, top 11 extends laterally a short distance beyond each side 12 to thereby define a laterally projecting horizontal rib 15 at each side of base 10 (FIG. 1 and 3). Each horizontal rib 15 is slightly thicker than the remainder of top 11, and constitutes an attractive trim piece as well as a means for minimizing scraping of side 12.

Referring to FIG. 6, it will be noted that corner 14 terminates along a radiused junction 14a with side 11. This radius insures that there is no sharp inside corner at the junction 14a which would inhibit cleanability.

Two front casters 22a are supported in front caster mounts 17 and two rear casters 22b are supported in rear caster mounts 20 (FIG. 6). Front casters mounts 17 depend downwardly from beneath top 11 near each front corner of base 10.

Rear caster mounts 20 depend downwardly from each rear corner of top 11, but additionally are integral with side 12 and flange 50 in the area where those two members merge (FIG. 6). Rear caster mounts 20 are positioned as far back of the plane of back 30 as possible, without allowing the rear casters 22b to interfere with the vertical stacking of carts 1 (FIG. 9). If rear caster 22b were any farther back, they would bump into the back 30 of a lower cart 1. They are as far back as possible, however, in order to prevent a cart 1 from tipping over backwards. Because of this rearward positioning, rear caster mounts 20 must project rearwardly from beneath base 10. Thus, the top surface 20a of rear mount 20 slopes downwardly from base 10 to provide an attractive as well as functional member (FIG. 4).

Each of the front and rear caster mounts 17 and 20, respectively, defines a deep aperture 23 for receiving the pintles of casters 22 (FIG. 6). Front caster mount 17 is stabilized by a longitudinal rib 19 extending therefrom to front 13 and by a lateral rib 18 extending therefrom to a slide 12. Additionally, longitudinal rib 19 and lateral rib 18 act to reinforce top 11. Similarly, a forwardly extending rib 21 acts to stabilize each rear caster mount 20 and to provide reinforcement for top 11. All ribs 18, 19 and 21 are radiused at their junctions with caster mounts 17 and 20 and with top 11 to facilitate cleaning.

Back 30 extends upwardly from the rear of base 10. It is a sheet-like, generally planar panel which is reinforced at its sides by flanges 50. Back 30 overhangs flanges 50 to form a decorative bumper rib 31, which is slightly thicker than back 30 generally (FIGS. 2 and 7). Back 30 includes a number of longitudinal deviations which define upwardly and outwardly projecting rails 40. The rails 40 are about the same thickness as the sheet-like back 30, effecting economy of construction. The longitudinal deviations are apertured at their tops to define upwardly opening slots 45 between each rail 40 and the generally planar back 30. Slots 45 are closed at their ends by end walls 43 which are integral with back 30 and rail 40 (FIG. 7). Because of end walls 43, articles supported on the rails 40 cannot slide off the ends thereof.

The junction between end walls 43 and rails 40 comprises rounded corners 44 to facilitate cleaning. The junction 43a between end walls 43 and back 30 is also radiused. Similarly, the rails 40 define a gradually forwardly and upwardly sloping portion 41 such that no sharp corners are created at the junction between the sloping portion 41 and back 30 (FIG. 8). The outwardly sloping portion 41 then curves gradually upwardly to define a vertical portion 42. A plurality of rails 40 are provided at varying heights such that more than one supporting frame 2 can be hung on back 30, or such that the height at which support frame 2 is carried can be varied.

Figure 12:
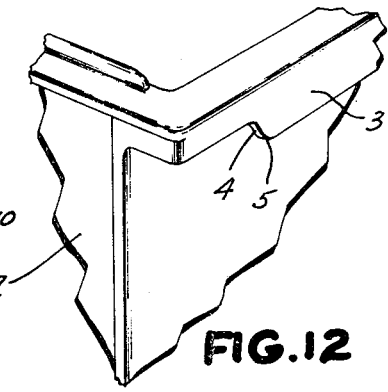
FIG. 12 is a rear perspective, fragmentary view of a drawer supporting structure for hanging on the cart.

The hanger 3 of drawer supporting frame 2 is designed for seating of a rail 40 (FIG. 12). It projects rearwardly and then downwardly to define a hook. At its top, hanger 3 is approximately the same dimension in width as is slot 45 in length. The ends 4 of hanger 3 then narrow down to rounded corners 5. Because hanger 3 is narrower between corners 5, it is easier to fit into slot 45. Lateral positioning is not overly critical. Once hanger 3 is started into slot 45, the sloped ends 4 will guide hanger 3 into a positive, centered position on rail 40.

Support frame 2 itself is approximately as wide as cart 1. Thus, it is neatly, attractively and soundly carried thereon. Dangerous and obstructive overhanging is eliminated.

The flanges 50 extend rearwardly from each side of back 30 and are radiused at their junctions 51 with back 30 (FIG. 7). Their rear edges are inclined slightly to the vertical such that they are wider at their bottoms than at their tops. At base 10, they merge with sides 12 and are continuous therewith.

At base 10, the flanges 50 extend farther rearwardly than do rear caster mounts 20 (FIG. 6). This facilitates their mating engagement with the combination bumper and ganging means 60 (FIG. 11). Combination bumper and ganging means 60 is made of a tough, resilient material which protects objects which might be banged by the front corners 14 of the cart (FIG. 10). It is secured to the cart 1 with adhesives or by mechanical fastening with bolts or the like. A sheet portion 61 wraps around each front corner 14 of the base 10. A tab 62 extends forwardly from sheet portion 61, generally perpendicular to front 13. The tabs 62 are spaced slightly more closely together than are flanges 50 such that they can be matingly inserted between the flanges 50 to facilitate ganging. In this manner, two or more carts can be lined up and can be pushed along together, even when loaded with shelf supporting structures 2 or the like.

A hanger 70 projects rearwardly and downwardly from back 30 to facilitate another type of ganging, i.e. stacking (FIG. 9). Its top surface is continuous with the inside surface of outwardly sloping portion 41 on rail 40 (FIG. 8). At one point, approximately at its junction with back 30, hanger flange 70 has a width dimension approximately the same as the length of upwardly opening slot 45. From there, hanger flange 70 slopes inwardly at its ends to rounded corners 72 (FIG. 4). The fact that hanger 70 is narrower at its outer extremity between rounded corners 72 and the fact that the corners 72 are rounded make it easier to insert hanger 70 into a slot 45 on another cart. Precise lateral positioning of one cart with respect to the other is not necessary.

The handle 80 is formed in part by the top portions 81 of flanges 50 (FIG. 3). Each flange 50 widens near its top to define a rearwardly flared top portion 81. A bar 82 extends between flared tops 81 and acts in combination therewith to define generally a handle 80 (FIG. 5). A centerpost 83 extends between the center of bar 82 and the top of back 30 to further rigidify both handle 80 and back 30. In this manner, handle 80 provides both a means for controlling cart 1 and a structurally reinforcing member.

In operation, drawers are filled at a central location and placed in drawer supporting structure 2. This in turn is loaded onto cart 1. Its hanger flange 3 is inserted into an upwardly opening slot 45 defined by an upwardly and outwardly projecting rail 40. Slot 45 is closed at its ends by end walls 43 such that supporting frame 2 will be positively held in lateral position with respect to cart 1. Thus, cart 1 can readily be transported with-out fear that drawer supporting structure 2 will slide off the ends thereof.

When desired, two or more loaded carts can be pushed in ganging fashion by aligning them such that the tabs 62 of combination bumper and ganging members 60 are matingly inserted between the flanges 50. Even when tabs 62 are not to be so used, combination bumper and ganging member 60 provides a means for protecting walls and other objects from being marred when contacted by cart 1.

When empty, carts 1 can be stacked by inserting the hanger flange 70 of one cart into an upwardly opening slot 45 on another cart. In this manner, a plurality of carts can readily be stacked either for storage or for transport.

The carts 1 can be readily cleaned, and might well be used in a work cycle which requires regular cleaning. Sharp inside corners have been eliminated. The smooth surface of the cart can be wiped clean with ease.

Thus, it can be seen that the cart 1 of this invention is versatile, cleanable and of economical construction. Of course, it is understood that the above is merely a preferred embodiment of this invention and that many changes and alterations can be made thereof without departing from its spirit and broader aspects.

The embodiments of the invention in which an exclusive property or privilege is claimed are defined as follows:

1. A cart for conveying drawer supporting structures and the like, said cart comprising: a wheeled base; a generally planar, upstanding plastic sheet-like panel on said base for supporting objects thereon; said panel including an outwardly projecting, longitudinal deviation therein, open on top to define an upwardly opening slot for receiving the hanger portion of objects to be supported thereon; said deviation being shorter than the width of said cart and being closed at its ends whereby an object supported thereon cannot slide off of the ends thereof; said deviation curving gradually away from said panel at all points such that no sharp corners are formed thereby to inhibit cleanliness.

2. The cart of claim 1 in which said deviation is approximately the same thickness as said panel.

3. The cart of claim 1 in which said panel is positioned at the rear of said base and said deviations project forwardly towards the front of said cart; said panel further comprising a hanger projecting rearwardly and downwardly therefrom; said hanger being narrower in width than said slot whereby one of said carts can be hung in said slot in another of said carts and can be stored and transported thereby.

4. The cart of claim 3 in which the ends of said hanger are slanted inwardly and in which the projecting corners of said hanger are rounded to facilitate the easy insertion of said hanger into said slot on another of said carts.

5. The cart of claim 1 comprising: a generally vertical rigidifying flange projecting rearwardly from said panel, generally at either side thereof, for rigidifying said sheet-like panel.

6. The cart of claim 5 in which said panel is integrally formed with said base, said base having a downwardly depending front wall and two downwardly depending sidewalls, whereby molding of said cart is facilitated.

7. The cart of claim 1 in which said panel is integrally formed with said base, said base having a downwardly depending front wall and two downwardly depending sidewalls, whereby molding of said cart is facilitated.

8. A cart for conveying drawer supporting structures and the like, said cart comprising: a wheeled base and an upstanding back for supporting objects to be transported; a rearwardly projecting flange at each side of the rear of said base; a resilient bumper at each front corner of said base, said bumper including a forwardly projecting tab; said tabs being spaced slightly closer together than said rearwardly projecting flanges whereby said tabs of one cart can be matingly inserted between said flanges of another cart to facilitate the gang transporting of said carts.

9. The cart of claim 8 in which each of said rearwardly projecting flanges extends up each side of said back to provide a structural reinforcing rib for said back.

10. A cart for transporting drawer supporting structures and the like, said cart comprising: a wheeled base and an upstanding back for supporting objects to be transported; a resilient bumper having an integral ganging means formed thereon; said bumper being positioned at each front corner of said base; means at each rear corner of said base for mating with said ganging means of said bumper on another of said carts whereby said carts can be gang transported, said means at each rear corner and said ganging means being the only interconnection between adjacent carts when they are gang transported.

11. A cart for transporting drawer supporting structures and the like, said cart comprising: a wheeled base and an upstanding back for supporting objects to be transported; a resilient bumper having an integral ganging means formed thereon; said bumper being positioned at each front corner of said base; means at each rear corner of said base for mating with said ganging means of said bumper on another of said carts whereby said carts can be gang transported; each front corner of said base being rounded; said resilient bumper comprising a sheet-like portion wrapping around said front corner; said ganging means comprising a tab projecting forwardly from said sheet portion; said means for mating with said combination bumper and ganging means comprising a flange projecting rearwardly from each rear corner of said base; said rearwardly projecting flanges being spaced slightly farther apart than said tabs whereby said tabs can be matingly inserted between said flanges to facilitate gang transportation of said carts.

12. A plastic cart for transporting drawer supporting structures and the like, said cart comprising: a wheeled base having a planar top, a downwardly depending front, and downwardly depending sides; said top extending laterally a short distance beyond said sides to define a horizontal rib at each side of said base; said front of said base being flush with the edge of said top and extending around each front corner a short distance, still flush with said top; an upstanding, sheet-like back panel positioned at the rear of said base and being integrally molded therewith; integrally molded flanges projecting rearwardly from said panel at either side thereof, extending the height of said carts, and being continuous with said sides of said base; said panel extending slightly laterally beyond said flanges to define a vertical rib at each side of said cart which is continuous with said horizontal rib; upwardly and outwardly projecting deviations in said panel, each defining an upwardly opening slot, closed at both ends, for receiving a hanger of an object to be supported; a handle projecting rearwardly from the top of said panel whereby said cart can be maneuvered.

13. The cart of claim 12 in which a resilient bumper is positioned at each front corner of said base; said bumper including a forwardly projecting tab; said tabs being spaced slightly closer together than said rearwardly projecting flanges for mating insertion between said flanges of another of said carts whereby said carts can be ganged transported.

14. The cart of claim 12 in which said flanges flare outwardly near the top of said back and in which a bar extends therebetween to form said handle for said cart; a reinforcing centerpost extending between said panel and said bar and being integrally molded with both.

15. The cart of claim 12 in which said panel comprises a downwardly and rearwardly projecting hanger flange having a top surface which is continuous with the inside surface of one of said deviations; said hanger flange having a width at one point approximately the same as the length of said slot whereby one of said carts can be hung in a slot of another of said carts; said hanger flange sloping inwardly at each end towards rounded corners and being narrower at said corners than the length of said slot whereby said hanger flange can be more easily inserted into one of said slots.

16. The cart of claim 12 in which said laterally extending portion of said panel and said laterally extending portion of said top of said base are thicker than said panel and said top respectively.

17. The cart of claim 12 in which said deviation is approximately the same thickness as said sheet-like back.

18. A transportation system comprising: a cart having a wheeled base; a molded plastic, upstanding panel on said base for supporting objects thereon; said panel including an outwardly and upwardly projecting, longitudinal deviation defining an upwardly opening slot in said panel, there being no panel surface behind said deviation; a frame for supporting drawers and having a back and two sides; a hanger projecting rearwardly and downwardly from said back for insertion into said slot; said deviation in said panel of said cart being shorter than the width of said cart and being closed at its ends whereby said hanger cannot slide off the ends thereof; said hanger having a width dimension at one point which is approximately equal to the length of said slot; said hanger narrowing inwardly from said point, in a direction downwardly from said point, and having rounded corners whereby insertion of said frame into said slot is facilitated while said hanger ultimately seats securely in said slot.

19. The cart of claim 18 in which said deviation is approximately the same thickness as said panel.

* * * * *